United States Patent [19]

Ebisaka

[11] Patent Number: 4,502,086
[45] Date of Patent: Feb. 26, 1985

[54] DIFFERENTIAL PROTECTIVE RELAY

[75] Inventor: Toshinobu Ebisaka, Hyogo, Japan

[73] Assignee: Mitsubishi Denki Kabushiki Kaisha, Tokyo, Japan

[21] Appl. No.: 506,577

[22] Filed: Jun. 22, 1983

[30] Foreign Application Priority Data

Jul. 1, 1982 [JP] Japan .................................. 57-115988

[51] Int. Cl.³ ........................ H02H 3/28; H02H 7/045
[52] U.S. Cl. ........................................ 361/87; 361/36; 361/67; 361/86
[58] Field of Search ...................... 361/36, 87, 79, 86, 361/35, 78, 84, 62, 67

[56] References Cited

U.S. PATENT DOCUMENTS 3,974,423 8/1976 Ulyanitsky et al. ............... 361/36 X
4,204,237 5/1980 Zocholl .............................. 361/36
4,237,512 12/1980 Forford ............................... 361/87

OTHER PUBLICATIONS

Mitsubishi "Bus-Protection Relay System" Pamphlet, pub. date unknown.
"Busbar Differential Protection Type RYDSS" by Forford, Internal ASEA Publication, pub. date unknown.
"Basic Theory of Bus Differential Protection Type RADSS" ASEA Phamphlet RK63-200E, Edition 1, 1978.
"A Half Cycle Bus Differential Relay and its Application", by Forford, Internal ASEA, Publication; 11-1-3-73.
"Applied Protective Relaying" Westinghouse Electic Corp., Relay Instr. Div. 1979, pp. 9-1 through 9-10.

Primary Examiner—Patrick R. Salce
Attorney, Agent, or Firm—W. E. Zitelli

[57] ABSTRACT

A differential protective relay for protecting devices on an ac electrical power system. The protected devices can include a transformer, a generator, or a station bus. The differential protective relay evaluates the current flowing into and out of the protected device only during the period when the current transformers are not saturated. The differential protective relay also detects internal faults accompanying external faults by evaluating the ratio between the current flowing into and out of the protective device. When this ratio exceeds a predetermined limit the protective relay evaluates the difference between the current flowing into and out of the device to determine if this difference is sufficiently large to trip the relay. When a current transformer associated with the differential protective relay is saturated, the differential protective relay produces a restraint signal to restrain tripping.

7 Claims, 6 Drawing Figures

DIFFERENTIAL PROTECTIVE RELAY

BACKGROUND OF THE INVENTION

1. Field of the Invention

This invention relates generally to differential protective relays for protection of generators, transformers, or station buses, and more specifically to such differential protective relays incorporating means for overcoming the effects of current transformer saturation and for permitting the trip decision to be made at high speed.

2. Description of the Prior Art

Differential protective relaying systems are well known and frequently used for the protection of generators, transformers, and station buses. These differential systems are based on the principal of balancing or comparing the secondary currents of the current transformers located at the input and output terminals of the protected equipment.

In the basic differential protection scheme current transformers are located on each side of the protected device, and a protective relay is disposed between the current transformers such that no differential current flows through the protective relay under normal conditions because the secondary currents through the current transformers are balanced. When an external fault occurs current flow increases at both the input and output terminals of the protected equipment, but the balance between these currents is maintained. Therefore, the protective relay does not operate for the external fault condition.

When a fault occurs in the protected equipment, the current flow on one side of the protected equipment is reversed, thus upsetting the normal current balance at the protective relay. The unbalanced condition causes a differential current to flow through the protective relay, and the protective relay operates to trip the appropriate circuit breaker.

As can be seen, the performance of the protective relay in a differential scheme depends significantly on the performance of the current transformers associated with the protective relay. The current transformers must interpret, in their secondary windings, the ac current conditions existing in the electrical power network and transmit this information to the protective relay. Any secondary error current in a current transformer on one side of the protected equipment upsets the current balance between the current transformers at each side of the protected equipment and sends a current through the relay's operating coil. If this current exceeds the pick-up setting of the relay, the relay operates to trip the circuit breaker and disconnect the faulty equipment. Thus, small error currents in the current transformers can cause erroneous operation of the protective relay.

The secondary current produced by the current transformer is proportional to the primary current, up to a nominal rating for the current transformer. For primary currents above this rating the current transformer saturates, and the secondary current of the heavily saturated current transformer diverges from this ratio. Saturation is usually due to an external fault, which produces a current transformer primary current that is heavier than normal.

AC saturation of the current transformer is not particularly troublesome since it can be calculated, and compensation provided for the resulting errors in secondary current. If, however, the fault current is asymmetrical, a dc component is present. When this dc component decays slowly because of a long dc time constant (large L/R ratio) transient saturation of the current transformer results. This condition occurs more frequently in the protection of generating station buses where the dc time constant of the circuit is likely to be long. For most substation buses, the time constant is short and no appreciable effect from dc saturation results. The presence of a prolonged dc component produces a severe transient saturation of the current transformer. Although it would be technically possible to design a current transformer that would not saturate, such a current transformer would require a cross-section of iron as much as 100 times larger than current transformers of the standard well-known construction.

To overcome the effects of current transformer saturation and secondary error currents, various well-known features have been added to the simple overcurrent protective relay when used in a differential protection scheme. Restraining (or contact-opening) windings in a differential relay permit more sensitive relay settings. This affords greater protection than is possible with a simple overcurrent relay whose trip settings would otherwise have to be high enough to prevent undesired operation due to current transformer performance under heavy through-fault current (i.e., an external fault). Percentage differential relays have two or more restraining windings. On an external fault, the restraining torque is strong and tends to prevent false tripping due to the differential current through the protective relay caused by saturation effects of the current transformers. On internal faults most of the current in the restraining windings is in opposite directions so the total restraint torque is much less than for an external fault. Some relays with restraining windings are designed to trip when a constant percentage of unbalance exists between the restraining currents. Other relays operate over a variable range of differential current and have a variable percentage characteristic. That is, as the magnitude of the restraining current increases, a greater amount of differential or operating current is required to trip the relay.

Another scheme for overcoming the effects of secondary currents errors is by loading the current transformers with a high-impedance protective relay. (See *Applied Protective Relaying,* Westinghouse Electric Coporation Relay-Instrument Division, 1979, p. 9-8-9-10.) All the current transformers are connected in parallel with a high impedance protective relay. Under normal conditions the voltage at the relay terminals is approximately zero. For an external fault, the voltage at the relay terminals remains at approximately zero if the current transformers on the source-side and fault-side of the protected equipment are not saturated. However, during severe external faults, one of the current transformer nearest the fault may saturate and no voltage or current is developed in its secondary winding. The other current transformers would then have to force their current into the faulted current transformer and the relay. Since the relay impedance is much higher than that of the saturated current transformer, most of this external fault current flows into the saturated current transformer, preventing the protective relay from operating despite saturation of the current transformer nearest the fault. For an internal fault, the impedances of all the current transformers and the relay are high, presenting a high impedance burden to the current transformers. A high voltage appears at the relay terminals; since this voltage is well above the pick-up setting of the relay the protective relay operates. This scheme of differential protection using a high impedance relay is particularly suited for protecting station buses where the dc component of the short circuit current has a long time constant and causes saturation of the current transformers.

Another scheme for preventing relay tripping caused by current transformer errors uses linear coupler transformers instead of current transformers. (See *Applied Protective Relaying*, Westinghouse Electric Corporation Relay-Instrument Division, 1979, p. 9-1-9-7.) The linear couplers are air core mutual reactors. They are similar to current transformers in general appearance and structural detail except they have an air core with a permeability of 1.0. Thus, the linear couplers do not saturate or create error currents even when heavy primary current flows. The linear coupler transformer produces a secondary voltage proportional to the applied primary current.

The linear coupler method of differential protection is essentially a voltage differential scheme and, consequently, the linear couplers are connected in series. For an external fault, the sum of the voltages induced in the linear couplers is zero. This occurs because the sum of the currents flowing to the bus is equal to the sum of the currents flowing out of the system. As a result, the relay does not trip. In the case of an internal fault there is a difference voltage that appears at the terminals of a high speed, low energy, linear coupler relay. This difference voltage causes the linear coupler relay to trip instantaneously. Like the high impedance relay scheme, the linear coupler scheme is particularly suited to the protection of station buses where the dc component of short circuit current has a long time constant and causes saturation in conventionally-designed current transformers.

Another prior art bus differential protective relay is described in a pamphlet published by ASEA ("Basic Theory of Bus Differential Protection Type RADSS", Pamphlet RK63–200E, Edition 1, 1978). This protective relay uses conventional current transformers with series-connected diodes to develop currents representative of the positive and negative half-cycle currents in the transmission lines connected to the bus. These currents develop restraint and operate voltages across resistors. The restraint voltage predominates when the total current leaving the bus equals the total current entering the bus. Also, for this condition the differential current is zero. Relay operation is the same for external faults. For external faults that cause current-transformer saturation, the differential current is blocked although it would otherwise be non-zero. For an internal fault the operate voltage predominates and the relay trips.

Yet another prior art scheme is illustrated in FIG. 1. In FIG. 1, reference numeral 200 denotes a station bus that is to be protected by a differential protective relay 218, reference numerals 205 and 224 denote transmission lines connected to the station bus 200, reference numerals 204 and 226 denote current transformers installed on the transmission lines 205 and 224 for deriving secondary currents as the normal direction of current flowing into the station bus 200. Transformers 206 and 222 are connected across the current transformers 204 and 226, respectively. Diodes 208 and 219 have anode terminals connected to first terminals of the transformers 206 and 222, respectively, for synthesizing positive half-cycles from the current waveforms produced by the current transformers 204 and 226. Diodes 210 and 220 have cathode terminals connected to the first terminals of the transformers 206 and 222, respectively, for synthesizing negative half-cycles. The cathode terminals of diodes 208 and 219 are connected together; the anode terminals of the diodes 210 and 220 are connected together. The cathode terminals of diodes 208 and 219 are connected to the anode terminals thereof via a series combination of resistors 212 and 214. Second terminals of the transformers 206 and 222 are connected to a first terminal of a resistor 216; a second terminal thereof is connected to a common terminal between the resistors 212 and 214. The resistor 212 converts the positive half-cycle current into a voltage $V_1$. The resistor 214 converts the negative half-cycle current into a voltage $V_2$. The resistor 216 synthesizes the positive and negative half-cycles to obtain a differential voltage $V_0$.

The differential protective relay 218 discriminates between the occurrence of external and internal faults using the voltage $|V_1|+|V_2|$ (i.e., the absolute value of the positive half-cycles of the currents flowing into and out of station bus 200 plus the absolute value of the negative half-cycles of such currents as a restraining quantity, and the voltage $V_0$ (i.e., the voltage corresponding to the difference between the absolute value of currents flowing into and out of the station bus 200 as an operating quantity.

Operation of this prior art device is described below. Under ordinary conditions when the current transformers 204 and 226 are not saturated or when there is an external fault, the absolute value of current flowing into the station bus 200 equals the absolute value of the current flowing out of the station bus 200 according to Kirchhoff's law. Namely, $V_0=0$, $|V_1|+|V_2|\neq 0$, and $|V_1|=|V_2|$. There is no operating quantity and the differential protective relay 218 does not operate.

When there is an internal fault accompanying an external fault, the absolute value of current flowing into the station bus 200 and the absolute value of current flowing out of the station bus 200 are unbalanced, so that $V_0\neq 0$, $|V_1|+|V_2|\neq 0$ ($V_1\neq V_2$). If the ratio of the operating quantity to the restraining quantity exceeds a predetermined ratio, the differential protective relay 218 operates. Typically, the prior art relay is designed to operate when the ratio of current flowing out of the station bus 200 to the current flowing into the station bus 200 is ½ or less. Using this ½ ratio figure, yields a ratio for $V_0$ to $|V_1|+|V_2|$ of 1 to 3, so that the relay operates when the ratio of $V_0$ to $|V_1|+|V_2|$ is ⅓ or more.

As discussed above, current transformer saturation causes the current transformer to produce a secondary current during only limited periods of the ac cycle. When the current transformer is saturated, the differential quantity ($V_0$) is zero. However, during other portions of the ac cycle the ratio of $V_0$ (the operating quantity) to $|V_1|+|V_2|$ (the restraining quantity) is 1 to 1. When such a ratio exists the relay operates erroneously.

For an external fault in which a dc component is superposed on the fault current, therefore, the determination whether the fault is internal or external must be made within a period of several milliseconds between the occurrence of the fault and current transformer saturation. After the fault is determined to have been external, the prior art protective relay is locked to prevent making a fault determination during saturation.

Compared to the prior art protective relays, the present invention is a solid state differential protective relay, for use with conventional current transformers, that is free from the influence of current transformer saturation and therefore able to determine the fault location at high speed. The present invention can also detect high-impedance bus faults, and is insensitive to transient responses.

SUMMARY OF THE INVENTION

A differential protective relay for detecting a fault in a protected device, e.g. a station bus, generator, or transformer, of an ac electrical power system is disclosed. The differential protective relay includes a current transformer located on the input side of the protected device for producing a current representative of the current flowing into the protected device, and includes a current transformer on the output side of the protected device for producing a current representative of the current flowing out of the protected device. The differential protective relay produces a suppression signal having a predetermined duration when the currents flowing into and out of the protected device are equal. Also included in the differential protective relay is a differential detector for determining when the difference between the input and output currents exceeds a predetermined limit and for producing an operating signal in response thereto. When this predetermined limit is exceeded and the suppression signal is not present the differential protective relay operates to trip the circuit breaker.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figure 1:
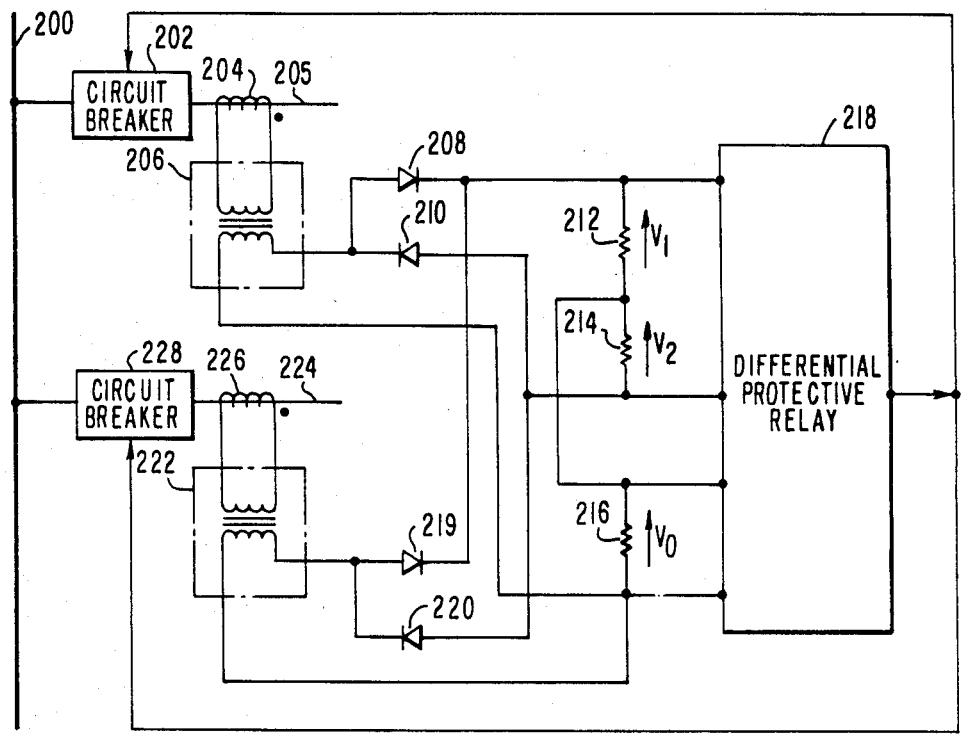
FIG. 1 is a diagram of a prior art differential protective relay.
Figure 2:
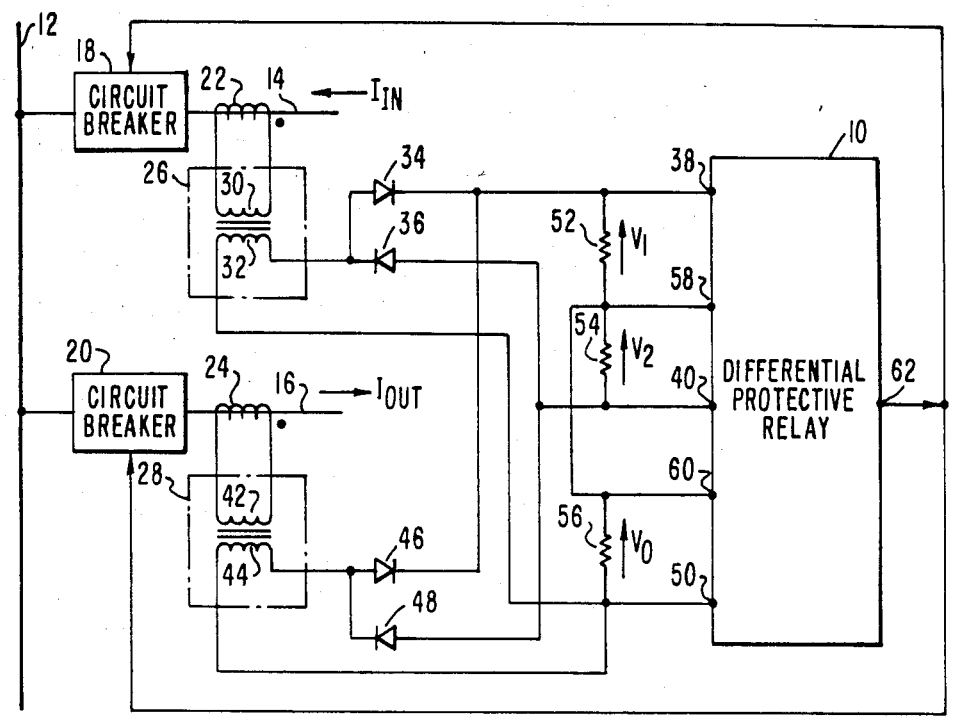
FIG. 2 is a partial block and partial schematic diagram of a station bus protected by a differential protective relay constructed according to the teachings of the present invention.

Turning to FIG. 2, there is illustrated a differential protective relay 10 for protecting a station bus 12. A transmission line 14 is connected to the station bus 12 via a circuit breaker 18; a transmission line 16 is connected to the station bus 12 via a circuit breaker 20. For simplicity only two transmission lines are shown in FIG. 2 although the differential protective relay 10 is capable of protecting a station bus having more than two transmission lines terminated thereat. A current transformer 22 is located proximate to the transmission line 14 and is responsive to a current $I_{IN}$ flowing along the transmission line 14 into the station bus 12. A current transformer 24 is located proximate to the transmission line 16 and is responsive to a current $I_{OUT}$ flowing from the station bus 12 along the transmission line 16. The current flow directions are chosen for simplicity in explaining operation of the differential protective relay 10; the direction of actual current flow depends on the load and generating capacity connected to each of the transmission lines at the station bus 12.

A primary coil 30 of a transformer 26 is connected across the current transformer 22. A first terminal of a secondary coil 32 of the transformer 26 is connected to an input terminal 38 via a diode 34 and to an input terminal 40 via a diode 36. The cathode terminal of the diode 34 is connected to the input terminal 38, and the anode terminal of the diode 36 is connected to the input terminal 40. A second terminal of the secondary coil 32 is connected to an input terminal 50 of the differential protective relay 40.

The current transformer 24 is connected across a primary coil 42 of the transformer 28. A first terminal of a secondary coil 44 is connected to the input terminal 38 via a diode 46 and to the input terminal 40 via a diode 48. The cathode terminal of the diode 46 is connected to the input terminal 38, and the anode terminal of the diode 48 is connected to the input terminal 40. A second terminal of the secondary coil 44 is connected to the input terminal 50.

A resistor 52 is connected between the input terminals 38 and 58. A resistor 54 is connected between the input terminals 58 and 40. A resistor 56 is connected between an input terminal 60 of the differential protective relay 10 and the input terminal 50. Lastly, the input terminal 60 is connected to the input terminal 58. An output terminal 62 of the differential protective relay 10 is connected to an input terminal of the circuit breaker 18 and to an input terminal of the circuit breaker 20, for tripping the circuit breakers 18 and 20 when a fault occurs on the station bus 12. As depicted in FIG. 2; the voltage across the resistor 52 is designated $V_1$, the voltage across the resistor 54 is designated $V_2$, and the voltage across the resistor 56 is designated $V_0$. $V_1$ and $V_2$ are considered restraint quantities and $V_0$ an operating quantity.

In operation, the diodes 34 and 46 rectify the positive half-cycles of the signals from the current transformers 22 and 24, respectively. Likewise, the diodes 36 and 48 rectify the negative half-cycles of the signals from the current transformers 22 and 24, respectively. The voltage $V_1$ therefore represents the positive half-cycles of the signals $I_{IN}$ or $I_{OUT}$. The voltage $V_2$ represents the negative half-cycles of the signals $I_{IN}$ or $I_{OUT}$. Note that when $V_1$ represents the current $I_{IN}$ (via the diode 34), the voltage $V_2$ represents the current $I_{OUT}$ (via the diode 48). *During the negative half-cycles of the current $I_{IN}$* the opposite situation exists. That is, $V_1$ represents the current $I_{OUT}$ (via the diode 46), and the voltage $V_2$ represents the current $I_{IN}$ (via the diode 36).

The significance of the signals $V_0$, $V_1$, and $V_2$ under various fault conditions is now discussed. During no-fault or external fault conditions, without current transformer saturation $|I_{IN}| = |I_{OUT}|$. Both $|V_1|$ and $|V_2|$ are full-wave rectified signals and $|V_1| = |V_2|$. $V_0=0$ because, during one half-cycle, the voltage contribution across the resistor 56 from the diode 34 (positive) is cancelled by the contribution via the diode 48 (negative). A smiliar cancellation situation occurs during the other half-cycle.

For an internal fault on the bus 12, and assuming: no current transformer saturation, then $I_{IN}$ is produced by a generator (not shown in FIG. 2), and $I_{OUT}$ is fed to a load (not shown in FIG. 2) then $I_{OUT}=0$. During the positive half-cycle of $I_{IN}$, $V_1$ is a positive half-cycle voltage (developed across the resistor 52 via the diode 34) and $V_2=0$. During the negative half-cycle of $I_{IN}$, $V_1=0$ and $V_2$ is a negative half-cycle voltage (developed across the resistor 54 via the diode 36). Although |magnitude $V_1$| = |magnitude $V_2$|, these signals are 180° out of phase and therefore $|V_1| \neq |V_2|$. The voltages $V_1$ and $V_2$ developed across the resistors 52 and 54 also appear across the resistor 56 such that $V_0$ is an ac sinusoid.

When an internal fault accompanies an external fault $I_{IN} \neq I_{OUT}$, but neither is zero. The difference between $I_{IN}$ and $I_{OUT}$ depends on the distance from the bus 12 to the external fault. Like the case of a sole external fault, $V_1$ and $V_2$ are full-wave rectified signals, but due to the internal fault their magnitudes are not equal. Also, with external and internal faults $V_0 \neq 0$ because the positive and negative voltages developed across the resistor 56 do not completely cancel.

Figure 3:
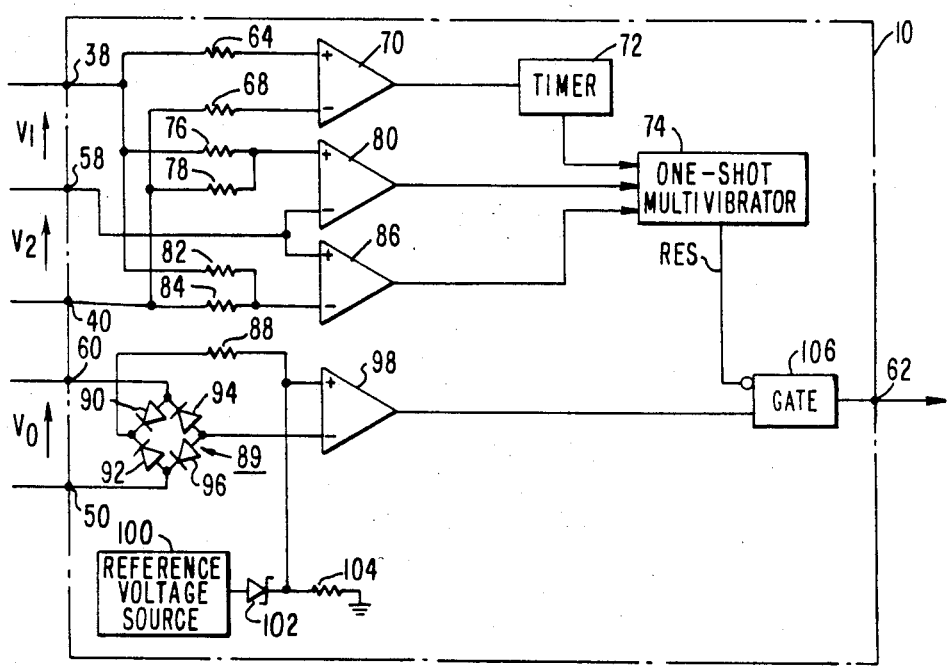
FIG. 3 is a schematic diagram of a differential protective relay constructed according to the teachings of the present invention and shown in block diagram form in FIG. 2.

Turning to FIG. 3, there is shown a detailed schematic of the differential protective relay 10. A resistor 64 is connected between the input terminal 38 and a non-inverting input terminal of an operational amplifier 70. A resistor 68 is connected between the input terminal 40 and an inverting input terminal of the operational amplifier 70. An output terminal of the operational amplifier 70 is connected to an input terminal of a timer 72, and an output terminal of the timer 72 is connected to a first input terminal of a one-shot multivibrator 74. The timer 72 has a delayed pick-up time. A resistor 76 is connected between the input terminal 38 and a non-inverting input terminal of an operational amplifier 80; a resistor 78 is connected between the input terminal 58 and the non-inverting input terminal of the operational amplifier 80. An inverting input terminal of the operational amplifier 80 is connected to the input terminal 58. An output terminal of the operational amplifier 80 is connected to a second input terminal of the one-shot multivibrator 74. A non-inverting input terminal of an operational amplifier 86 is connected to the input terminal 58. An inverting input terminal of the operational amplifier 86 is connected to the input terminal 38 via a resistor 82 and is connected to the input terminal 58 via a resistor 84. An output terminal of the operational amplifier 86 is connected to a third input terminal of the one-shot multivibrator 74.

A bridge rectifier 89 is connected between the input terminals 50 and 60. The bridge rectifier 89 comprises diodes 90, 92, 94, and 96. The junction between the diodes 90 and 94 is connected to the input terminal 60, and the junction between the diodes 92 and 96 is connected to the input terminal 50. The junction between the diodes 90 and 92 is connected to a non-inverting input terminal of an operational amplifier 98 via a resistor 88. The non-inverting input terminal of the operational amplifier 98 is also connected to ground via a resistor 104, and is responsive to a reference voltage from a reference voltage source 100 via a Zener diode 102. An inverting input terminal of the operational amplifier 98 is connected to the terminal between the diodes 94 and 96.

An output terminal of the one-shot multivibrator 74 is connected to a first input terminal of a logic gate 106. An output terminal of the operational amplifier 98 is connected to a second input terminal of the gate 106. An output terminal of the gate 106 is connected to the output terminal 62 of the differential protective relay 10.

The differential protective relay 10 operates in the following manner. The operational amplifier 70 produces an output signal when $|V_1| = |V_2|$. Due to the relationship between the values of the resistors 76 and 78, the operational amplifier 80 produces an output signal when the equation $k|V_1| > |V_2|$ is satisfied. Similarly, due to the ohmic values of the resistors 82 and 84, the operational amplifier 86 produces an output signal when the equation $k|V_2| > |V_1|$ is satisfied. In one embodiment of the present invention $k = \frac{1}{2}$. The operational amplifier 98 produces an output signal when the signal $V_0$ input thereto exceeds a predetermined voltage as determined by the reference voltage source 100, the Zener diode 102, and the resistor 104. Note that the voltage $V_0$ represents the phasor difference between $V_1$ and $V_2$.

During no-fault or external fault conditions (when neither of the current transformers 22 or 24 is saturated) the equation $|V_1| = |V_2|$ is satisfied. The operational amplifier 70 produces a high output signal, and after the pick-up time thereof, the output signal from the timer 72 goes high. As a result, a suppression signal, RES, from the one-shot multivibrator 74 goes high. The one-shot multivibrator 74 causes the suppression signal to persist for a predetermined duration irrespective of changes in the status of the signals input thereto, due, for example, to current transformer saturation after inception of an external fault. The predetermined time is chosen to ensure the signal RES is high during current transformer saturation. The suppression signal suppresses or blocks the gate 106, and the differential protective relay 10 does not operate. In effect, while the signal RES is high, changes in the output signals from the operational amplifiers 70, 80, or 86 (due to transients or current transformer saturation) cannot cause the differential protective relay 10 to operate.

For the case of an internal fault, during those periods when there is no current transformer saturation $|V_1| > |V_2|$, and one of the equations $k|V_1| > |V_2|$ and $k|V_2| > |V_1|$ is satisfied, the corresponding operational amplifier 80 or 86 produces an output signal maintaining the signal RES low. If the signal RES is low and the operational amplifier 98 has determined that $V_0$ exceeds the predetermined voltage reference, the differential protective relay 10 operates.

When there is current transformer saturation, the current transformer secondary current is nearly zero (an absolutely zero secondary current is impossible). Moreover, $|V_1| \neq |V_2|$ (i.e., there is no region in which the absolute value of the positive half-cycle signal instantaneously equals the absolute value of the negative half-cycle signal) the operational amplifier 98 produces an output signal), the signal RES is low and therefore the differential protective relay 10 operates.

The timer 72 is configured to have a predetermined pick-up time to prevent the suppression signal from being produced due to the phase shift of the currents flowing into and out of the station bus 12 in the case of an internal fault. A time delay associated with the output of the one-shot 74 (see FIG. 5) ensures that the high state of the suppression signal is not inhibited prematurely by the erroneous response of the operational amplifier 80 or 86 to the phase deviation between currents flowing into and out of the station bus 12, i.e. indicative of an internal fault.

Figure 4:
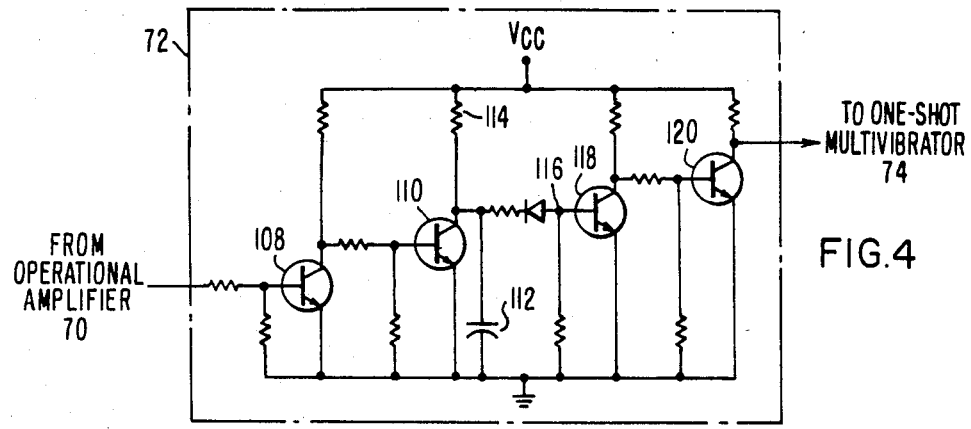
FIG. 4 is a schematic diagram of the timer of FIG. 3.

FIG. 4 illustrates the timer 72 in schematic form. When the signal from the operational amplifier 70 in FIG. 3 is high, a transistor 108 turns on, causing a transistor 110 to turn off. A capacitor 112 then begins to charge through a resistor 114. After a predetermined time the voltage across the capacitor 112 exceeds a predetermined voltage at a terminal 116, a transistor 118 then goes on, causing a transistor 120 to switch off. The output signal from the timer 72 then goes high.

Figure 5:
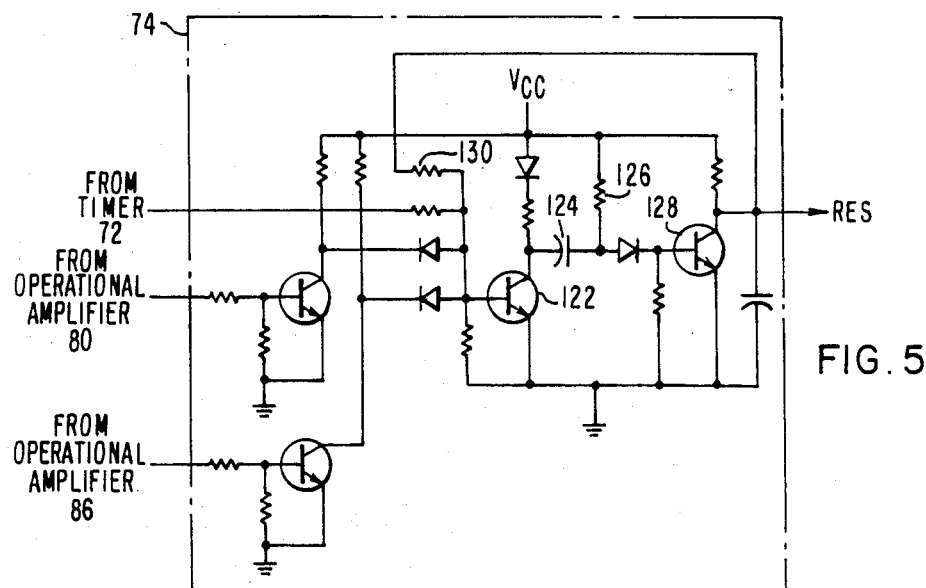
FIG. 5 is a schematic diagram of the one-shot multivibrator of FIG. 3.

In FIG. 5 there is illustrated a schematic diagram of the one-shot multivibrator 74 in FIG. 3. When the signal from the timer 72 is high and the signals from the operational amplifiers 80 and 86 are low, a transistor 122 switches on. When the transistor 122 switches on, a capacitor 124 charges through a resistor 126, with a time constant equal to the product of the values of the capacitor 124 and the resistor 126. Also, because the voltage across a capacitor cannot change instantaneously, the action of the transistor 122 switching on lowers the voltage at the base terminal of a transistor 128. Now the transistor 128, which was previously on, goes off and the signal RES goes high. This high signal is fed back to the base terminal of the transistor 122 by a resistor 130. Accordingly, the signal RES remains high while the capacitor 124 is charging despite any change in the state of the three signals input to the one-shot multivibrator 74.

Figure 6:
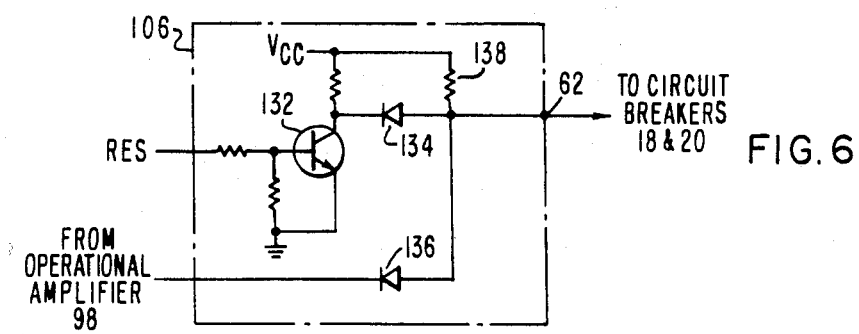
FIG. 6 is a schematic diagram of the AND gate of FIG. 3.

An examplary schematic for the AND gate 106 is illustrated in FIG. 6. A transistor 132 inverts the signal at the inverting input terminal of the AND gate 106. Diodes 134 and 136, and a resistor 138 form a diode-logic AND gate.

The advantages of the differential protective relay 10 of the present invention can now be more fully appreciated. The trip decision of the differential protective relay 10 is made only during those times when the current transformers 22 and 24 are not saturated. This feature is accomplished by making the trip decision before current transformer saturation and retaining this decision during saturation, by the action of the one-shot multivibrator 74. The differential protective relay 10 does not operate, regardless of the magnitude of the currents flowing into and out of the station bus 12 until after a predetermined period following the period during which the currents flowing into and out of the station bus 12 are equal.

What is claimed is:

1. A differential protective relay for detecting a fault in a protected device of an ac electrical power system, and for opening a circuit breaker in response to the fault, said differential protective relay comprising:
   means for producing a first current-derived signal representative of the current flowing into the protected device;
   means for producing a second current-derived signal representative of the current flowing out of the protected device;
   means for producing first, second, and third evaluation signals, wherein said first evaluation signal is representative of said first current-derived signal during the positive half-cycle thereof, and wherein said second evaluation signal is representative of said first current-derived signal during the negative half-cycle thereof and representative of the second current-derived signal during the negative half-cycle thereof, and wherein said third evaluation signal is representative of the phasor difference between said first and second current-derived signals;
   means for producing a predetermined reference signal;
   comparator means for producing an operating signal having a first state when said third evaluation signal exceeds said predetermined reference signal, and wherein said operating signal is in a second state at all other times;
   suppression means for producing a suppression signal having a first state when the absolute values of said first and second evaluation signals are equal, wherein said suppression signal is in said first state for a predetermined duration, and wherein said suppression signal is in a second state at all other times;
   and trip means responsive to said operating and suppression signals for producing a trip signal when said operating signal is in said first state and said suppression signal is in said second state, wherein the circuit breaker is responsive to said trip signal for opening the circuit breaker.

2. The differential protective relay of claim 1 wherein the means for producing the first current-derived signal includes a first current transformer having first and second output terminals.

3. The differential protective relay of claim 2 wherein the means for producing the second current-derived signal includes a second current transformer having first and second output terminals.

4. The differential protective relay of claim 3 wherein the means for producing the first, second, and third evaluation signals includes:
   first diode means having an anode terminal connected to the first output terminal of the first current transformer, and having a cathode terminal;
   second diode means having a cathode terminal connected to the first output terminal of the first current transformer, and having an anode terminal;
   third diode means having an anode terminal connected to the first output terminal of the second current transformer, and having a cathode terminal;
   fourth diode means having a cathode terminal connected to the first output terminal of the second current transformer, and having an anode terminal;
   first resistor means having first and second terminals, wherein said first terminal is connected to said cathode terminal of said first and third diode means;
   second resistor means having first and second terminals, wherein said first terminal is connected to said second terminal of said first resistor means, and wherein said second terminal is connected to said anode terminal of said second and fourth diode means.
   third resistor means having first and second terminals, wherein said first terminal is connected to said second terminal of said first resistor means, and wherein said second terminal is connected to the second output terminal of the first and second current transformers;
   and wherein the first evaluation signal develops across said first resistor means, the second evaluation develops across said second resistor means, and the third evaluation signal develops across said third resistor means.

5. The differential relay of claim 1 wherein the comparator means includes:
   means for rectifying the third evaluation signal to produce a rectified signal; and
   operational amplifier means having a first input terminal responsive to said rectified signal and a second input terminal responsive to the predetermined reference signal, for producing the operating signal.

6. The differential relay of claim 1 wherein the suppression means includes:
   first operational amplifier means for producing an equality signal when the absolute values of the first and second evaluation signals are equal;
   second operational amplifier means for producing a first ratio signal when the ratio of the first evaluation signal to the second evaluation signal exceeds a predetermined ratio;
   third operational amplifier means for producing a second ratio signal when the ratio of the second evaluation signal to the first evaluation signal exceeds said predetermined ratio;
   timer means for producing a timing signal in response to said equality signal, wherein said timer means has a predetermined pick-up time;
   and one-shot multivibrator means for producing the suppression signal in response to said timing, first ratio, and second ratio signals.

7. The differential protective relay of claim 1 wherein the trip means includes logic gate means responsive to the suppression signal and operating signal for producing the trip signal.

* * * * *